US005181693A

United States Patent [19]

Lorenz

[11] Patent Number: 5,181,693

[45] Date of Patent: Jan. 26, 1993

[54] EXTENSIBLE LIFTING TOWER WITH HYDRAULIC CYLINDERS IN SERIES

[76] Inventor: Gary V. Lorenz, 5206 37th Ave. Ct., Moline, Ill. 61265

[21] Appl. No.: 856,708

[22] Filed: Mar. 24, 1992

[51] Int. Cl.[5] .................... B60P 1/00

[52] U.S. Cl. .................... 254/2 R; 254/93 R

[58] Field of Search ............ 254/2 R, 2 B, 2 C, 93 R, 254/89 H, 29 R, 105-106; 187/17, 9 E, 8.43, 23; 92/137

[56] References Cited

U.S. PATENT DOCUMENTS

| | | | |
|---|---|---|---|
| 2,655,115 | 10/1953 | Holdeman et al. | 187/8.43 |
| 3,048,237 | 8/1962 | Rutherford | 187/8.43 |
| 3,829,063 | 8/1974 | Holzworth | 254/2 R |
| 4,337,845 | 7/1982 | Zelli et al. | 254/2 R |
| 4,447,042 | 5/1984 | Masui | 187/8.43 |

FOREIGN PATENT DOCUMENTS

| | | | |
|---|---|---|---|
| 2008805 | 1/1981 | German Democratic Rep. | 254/93 R |
| 1227099 | 3/1971 | United Kingdom | 187/8.43 |

*Primary Examiner*—Robert C. Watson
*Attorney, Agent, or Firm*—Glenn H. Antrim

[57] ABSTRACT

An extensible stabilizing tower similar to those positioned about hydraulic cylinders having multiple extensible stages is modified to effectively connect cylinders vertically in series. An upper stage of the stabilizing tower supports an upper cylinder or parallel cylinders, and base parallel cylinders connected to the base of the stabilizing tower are operative to lift the upper stage supporting the upper cylinder. A load connected to the header of the upper cylinder is lifted a distance equal to the sum of the extension of the base cylinders and the subsequent extension of the upper cylinder.

5 Claims, 2 Drawing Sheets

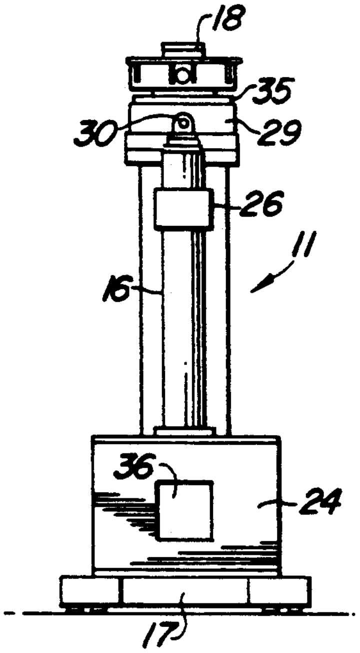
Fig. 1
Fig. 2
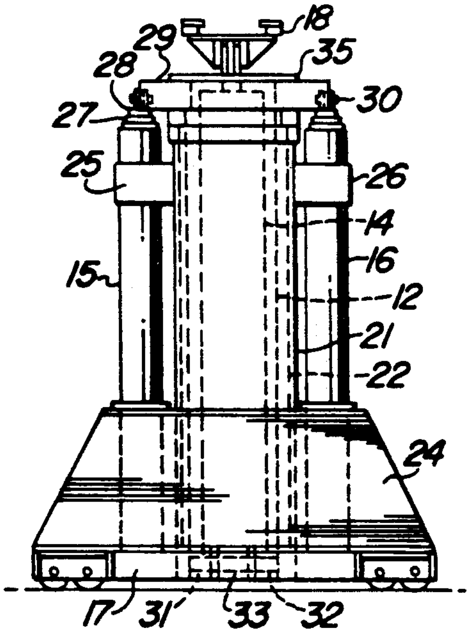
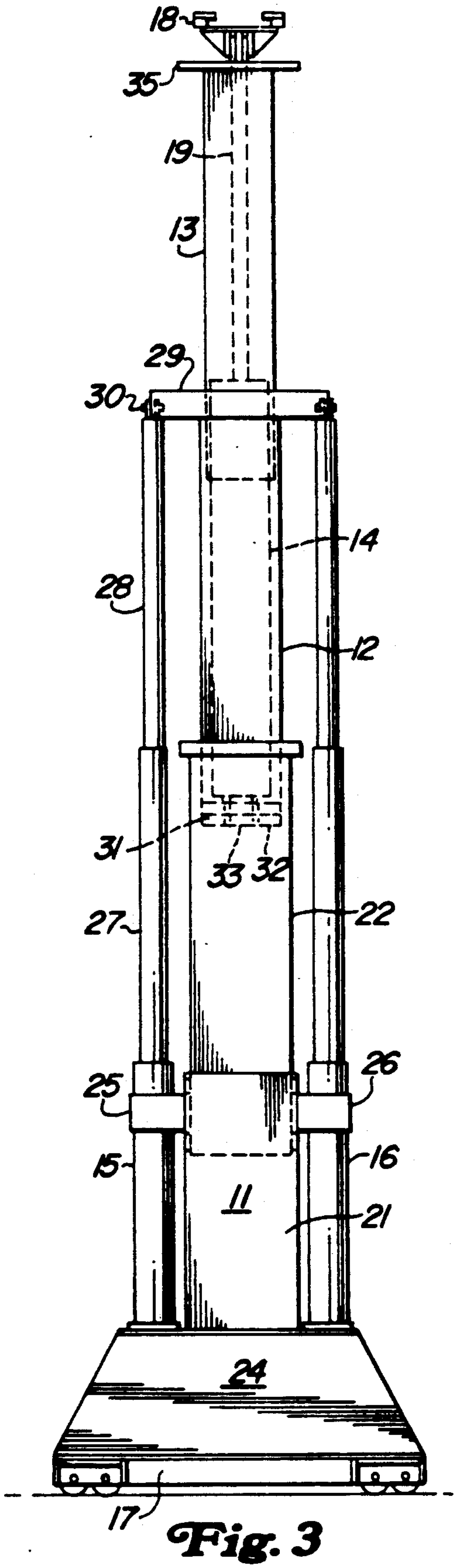
Fig. 3

EXTENSIBLE LIFTING TOWER WITH HYDRAULIC CYLINDERS IN SERIES

BACKGROUND OF THE INVENTION

This invention pertains to lifting apparatus having individual hydraulic cylinders in series for increasing upward extension. Particularly, a first parallel arrangement of cylinders is operative to lift an upper stage of an extensible stabilizing tower, and then another cylinder supported by the upper stage is operative to lift a load to a greater height.

Conventionally, a plurality of coaxial, telescoping hydraulic cylinders are used to provide in a single device greater extension than can be obtained by use of a simple lifting hydraulic cylinder having only one cylinder and one piston rod. A commercially available lifter utilizing coaxial cylinders is stabilized by a surrounding tower comprising a plurality of stages of closely fitting members with square or rectangular cross sections. When such a lifter has several cylinders, the outer cylinder is much larger than the inner cylinder and therefore has much greater capacity for lifting than is available at the higher levels where the cylinders are smaller. The complete assembly is big, heavy, and expensive.

In U.S. Pat. No. 4,336,840 issued to Thomas F. Bailey on Jun. 29, 1982, two cylinders operate in series in a structure that is not applicable to usual lifting jobs. The cylinders are connected together at the base ends such that the piston rods extend vertically in opposite directions. The bases are connected to a carrier that slides up and down a tower of fixed length, and the distal ends of the piston rods are connected respectively to the top and to the bottom of the tower.

SUMMARY OF THE INVENTION

The present lifting tower has an extensible stabilizing tower of several stages. Desirable minimum height is not much greater than that of a single stage. A base hydraulic lifting means connected between a base and an upper stage of the stabilizing tower is operative to lift that stage to the full extent of the capacity of the base lifting means. An upper hydraulic lifting means is secured to a platform at the bottom of this upper stage and is therefore lifted by the base hydraulic lifting means such that when this upper means is operated after the operation of the base hydraulic lifting means, a load on a header of the upper means is lifted a distance equal to the sum of the extensions of the two lifting means.

Each of the hydraulic lifting means may comprise a plurality of cylinders, and overlapping rigid vertical members of the extensible stabilizing tower may have different cross sections. For clarity, a preferred embodiment described herein has a minimum number of cylinders, and an applicable extensible stabilizing tower has a square or rectangular cross section.

The base hydraulic means comprise a pair of cylinders for lifting square or rectangular stages of the stabilizing tower, and the upper hydraulic lifting means is a single cylinder. Each of the pair of cylinders is located outward from the vertical center line of a respective opposite side of the lower or base stage of the stabilizing tower, and each is controlled to be extended simultaneously for raising the upper stage. The single upper cylinder has larger diameter to have about the same lifting capacity as the pair of cylinders. The base of the single cylinder is connected to a platform across the bottom of the upper stage (upper supporting stage) to be lifted by the pair of cylinders connected to the base. Compared with towers using only multiple coaxial cylinders, lifting towers according to this invention are compact, use readily available cylinders, cost less, and have about the same lifting capacity at the highest level of operation as at the lowest level.

BRIEF DESCRIPTION OF THE DRAWING

FIG. 1 is a side view of a contracted lifting tower;

FIG. 2 shows an adjacent, wider side of the tower;

FIG. 3 shows the tower fully extended as viewed from the side shown in FIG. 2.

DESCRIPTION OF THE PREFERRED EMBODIMENT

Figure 4:
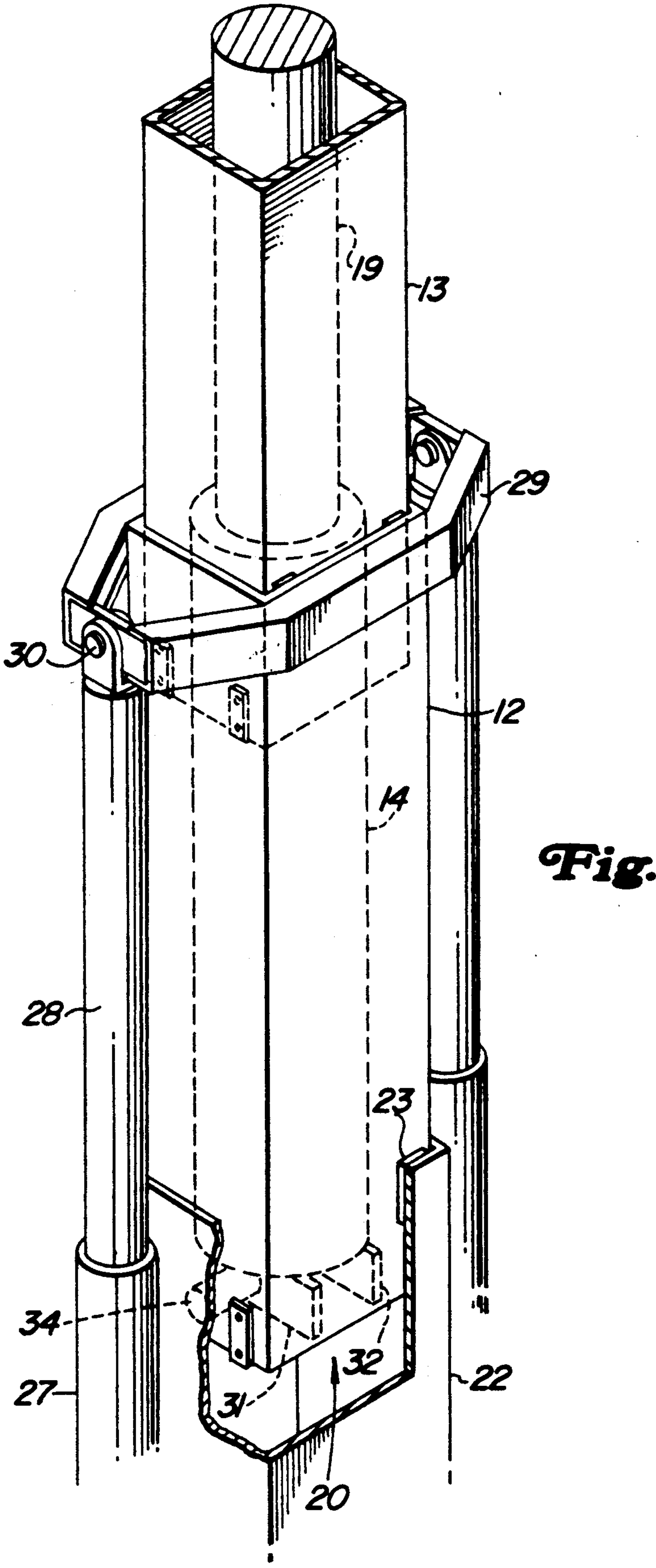
FIG. 4 is a fragmented perspective view of an upper section of the tower to show at the bottom of a stabilizing stage a platform to which a base of an upper hydraulic cylinder is secured.

As shown in the accompanying figures, an extensible stabilizing tower 11 (FIG. 3) is modified to have an upper stage 12 just below a top stage 13 to function as a support in addition to its usual stabilizing function. A platform 20 (FIG. 4) across the lower end of the upper supporting stage 12 supports an upper hydraulic lifting means which in this simple preferred embodiment is the cylinder 14. A base hydraulic lifting means is connected between a base 17 of the stabilizing tower 11 and the upper end of the upper supporting stage 12. This lifting means comprises a pair of cylinders 15 and 16 for extending the stabilizing tower 11 and thereby to elevate the upper supporting stage 12 and any load supported by a header 18 attached to the piston rod 19 of the cylinder 14. After full extension of the cylinders 15 and 16, the elevated cylinder 14 can be operated to raise the header 18 as far as the piston rod 19 is extended.

Referring namely to FIG. 3, the extensible stabilizing tower 11 has an intermediate stage 22 to be extended from the base stage 21 and has the upper supporting stage 12 to be extended after the extension of the intermediate stage. With particular reference to FIG. 4, the stages are rectangular in cross section and each stage to be extended is a sliding fit within an adjacent lower stage. For example, the lower end of the upper supporting stage 12 is a sliding fit within the upper end of the intermediate stage 22. Graphite blocks are positioned between adjacent sides of stages, such as the block 23 (FIG. 4) on the inside surface of the upper portion of the intermediate stage 22, to provide easy vertical sliding and tight lateral fit. Graphite lubricant is applied as required in the paths over which the blocks slide.

A rectangular base 17 with wheels supports the extensible stabilizing tower 11 and the two cylinders 15 and 16 that extend along opposite sides of the tower. The lower ends of the tower and the cylinders are secured to the base, and either a number of gussets, or preferably a box 24 as shown, is provided to reinforce connections to the base 17 for retaining the attached members vertical. The tower 11 and the cylinders 15 and 16 extend through the top of the box 24 and are secured to both the base 17 and the top of the box 24. Preferably the wider sides of the box 24 are isosceles trapezoidal, and the narrower sides slant inward from respective ends of the base nearly to the locations of the respective base cylinders 15 and 16. Additional reinforcement provided by brackets 25 and 26 that are connected to opposite respective sides of the base stage 21 and extend around the upper portions of the respective adjacent cylinders 15 and 16 may not be required with a strong box 24 as shown but may be desirable for reinforcement when gussets are used in place of the box.

The base cylinders 15 and 16 (FIG. 3) have respective extensible portions 27 for simultaneous extension to lift the intermediate stage 22 containing the upper supporting stage 12 of the stabilizing tower 11, and the portions or cylinders 27 have piston rods 28 for subsequent extension to lift the upper supporting stage 12. A flange 29 (FIG. 4) secured around the upper portion of the upper supporting stage 12 of the stabilizing tower 11 has a pair of trunnions 30 spaced from respective opposite sides of the stage 12 to be in line with respective piston rods 28. The upper end of each piston rod 28 is connected to the flange 29 by a respective one of the trunnions 30.

The platform 20 (FIG. 4) on which the upper cylinder 14 is secured has two spaced crossbars 31 and 32 with ends welded to opposite sides of the upper supporting stage 12. The crossbars 31 and 32 are equal distances from a central transverse line at the lower end of the stage. The spacing between the crossbars 31 and 32 is just sufficient for receiving a tongue 33 extending axially downward from the bottom of the upper cylinder 14. A retaining rod 34 extends through respective holes through the crossbar 31, the tongue 33, and the crossbar 32.

For greater stability, the top stage 13 of the extensible stabilizing tower 11 is desirable. The upper edge of the stage 13 is connected to a flange 35 secured to the upper end of the piston rod 19.

Except for a hydraulic line to the upper cylinder, components (not shown) for controlling hydraulic fluid are contained within the box 24 on the base 17. As the upper supporting stage is raised, a hose in a line (not shown) for the upper cylinder 14 is unwound from a reel within the box 24. The line enters the upper supporting stage 12 at the flange 29. A convenient arrangement provides a control valve to be operated for controlling consecutive extension of the cylinder 27 and the piston rod 28 and to transfer subsequently control to another valve to be operated for controlling extension of the piston rod 19 from the upper cylinder 14.

Required capacities for lifting specific loads to required levels can be obtained by obviously modifying the present lifting tower. An equal number of cylinders may replace each of the base cylinders 15 and 16. Any additional cylinders are to be arranged in a balanced configuration for lifting the extensible stabilizing tower 11, and trunnions on a flange corresponding to the flange 29 at the upper end of the upper supporting stage 12 are to be arranged to be in a vertical line with the axis of respective piston rods. The cylinders and the extensible stabilizing tower may have the required number of corresponding stages for obtaining a desired height of a load.

The upper supporting stage 12 may have sufficient width to support two parallel cylinders in place of the upper cylinder 14. Two cylinders can be equally spaced from a transverse centerline on the crossbars 31 and 32. Alternately, two pairs of crossbars may be spaced equally from a transverse centerline of the stage 12, and one or two cylinders placed in balanced configuration on each pair of the crossbars. From commercially available cylinders, cylinders may be selected for obtaining substantially the same maximum load capacity for the upper supporting stage corresponding to the stage 12 as for the header 18 at the top of the tower.

I claim:

1. A lifting tower comprising: a base, an extensible stabilizing tower, a base hydraulic lifting means, and an upper hydraulic lifting means, said extensible stabilizing tower comprising a base stage, at least one intermediate stage and an upper supporting stage, each of said stages having a vertical rigid member, the lower end of said base stage being secured to said base, the rigid member of each stage overlapping an adjacent one of said stages, guiding means between adjacent ones of said overlapping rigid members for allowing only vertical travel above and into said base stage, means for connecting said base hydraulic lifting means upright between said base and the upper end of said upper supporting stage, a header for contacting a load connected to the top of said upper hydraulic lifting means, a platform secured to the bottom of said upper supporting stage, means for securing the lower end of said upper hydraulic lifting means to said platform, said base hydraulic lifting means being operative to extend said extensible stabilizing tower, and said upper hydraulic means being operative subsequently to lift said header to a level substantially higher than the highest level of the upper end of said base hydraulic lifting means.

2. A lifting tower according to claim 1 wherein said extensible stabilizing tower has a top stage overlapping said upper supporting stage, guiding means between said upper supporting stage and said top stage, and the upper end of said top stage being connected to said header.

3. A lifting tower as claimed in claim 2 wherein the cross section of said rigid members of said respective stages are polygonal plane figures, said stages while said stabilizing extensive tower is contracted fitting closely within one another, said base stage being the outer stage.

4. A lifting tower as claimed in claim 3 wherein said upper hydraulic lifting means has the lower end thereof secured to said platform, the central axis of said upper hydraulic lifting means being in line with the central vertical axis of said upper supporting stage.

5. A lifting tower as claimed in claim 3 wherein the upper portion of said upper supporting stage has a surrounding flange, a pair of trunnions, said flange retaining said trunnions on a vertical plane through the centers of opposite sides of said upper supporting stage at equal distances from respective ones of said sides, said base hydraulic lifting means having a pair of cylinders, and the piston rods of said cylinders being connected to a respective ones of said trunnions for connecting said base hydraulic lifting means to said upper end of said upper supporting stage.

* * * * *